United States Patent [19]

Steinwand

[11] Patent Number: 5,314,943
[45] Date of Patent: May 24, 1994

[54] LOW VISCOSITY HIGH STRENGTH ACID BINDER

[75] Inventor: Paul J. Steinwand, Placentia, Calif.

[73] Assignee: Rohm and Haax Company, Philadelphia, Pa.

[21] Appl. No.: 620,269

[22] Filed: Nov. 30, 1990

[51] Int. Cl.$^5$ ............................................. C08L 33/26
[52] U.S. Cl. .................... 524/501; 524/519; 524/522; 524/521; 524/523; 524/524
[58] Field of Search ............... 524/521, 522, 523, 524, 524/519, 501

[56] References Cited

U.S. PATENT DOCUMENTS

| | | |
|---|---|---|
| 2,600,831 | 6/1952 | Baldsiefen . |
| 3,137,589 | 6/1964 | Reinhard et al. . |
| 3,366,509 | 1/1968 | Coglianese et al. . |
| 3,594,337 | 7/1971 | Shea ................... 524/521 |
| 3,616,166 | 10/1971 | Kelley . |
| 3,766,112 | 10/1973 | Blackford . |
| 4,181,639 | 1/1980 | Bomer et al. . |
| 4,289,676 | 9/1981 | Czauderna et al. . |
| 4,386,172 | 5/1983 | Yoshioka et al. . |
| 4,406,660 | 9/1983 | Beiner et al. . |
| 4,426,482 | 1/1984 | Kuramoto et al. . |
| 4,455,342 | 6/1984 | Fink et al. . |
| 4,543,386 | 7/1985 | Padget et al. . |
| 4,602,059 | 7/1986 | Van Rooden et al. . |
| 4,686,260 | 8/1987 | Lindemann et al. ................ 524/458 |
| 4,698,384 | 10/1987 | Mao . |
| 4,702,957 | 10/1987 | Mudge . |
| 4,743,498 | 5/1988 | Kedrowski et al. . |
| 4,904,724 | 2/1990 | Auchter et al. . |
| 4,939,200 | 7/1990 | Stack et al. . |
| 5,008,326 | 4/1991 | Stack . |
| 5,028,655 | 7/1991 | Stack ................... 524/521 |
| 5,104,923 | 4/1992 | Steinwand . |

FOREIGN PATENT DOCUMENTS

| | | |
|---|---|---|
| 0012032 | 11/1980 | European Pat. Off. . |
| 0019169 | 11/1980 | European Pat. Off. . |
| 0052561 | 5/1982 | European Pat. Off. . |
| 0084809 | 3/1983 | European Pat. Off. . |
| 0184153 | 11/1986 | European Pat. Off. . |
| 0224736 | 10/1987 | European Pat. Off. . |
| 0326298 | 8/1989 | European Pat. Off. . |
| 1441831 | 2/1969 | France . |
| 44-22749 | 9/1969 | Japan . |

*Primary Examiner*—Joseph Schofer
*Assistant Examiner*—Jeffrey T. Smith
*Attorney, Agent, or Firm*—Ronald D. Bakule

[57] ABSTRACT

A low viscosity, fast-curing binder for textile substrates is produced by admixing an aqueous emulsion copolymer latex with an aqueous solution copolymer formed by the copolymerization of an olefinically unsaturated polycarboxylic acid and an olefinically unsaturated monocarboxylic acid. Viscosities in the range of about 2 cps at 25% total solids to about 1000 cps at 35% total solids are realized by using solution copolymers containing about 40%–75% by weight of polycarboxylic acid.

30 Claims, No Drawings

5,314,943

LOW VISCOSITY HIGH STRENGTH ACID BINDER

FIELD OF THE INVENTION

This invention relates to binders for textile materials. In one of its more particular aspects this invention relates to polymeric binders having the properties of low viscosity and high strength.

BACKGROUND OF THE INVENTION

During the past few years there has been a substantial growth in the production of high-strength textile materials, especially paper and cloth products having a nonwoven, randomly-oriented structure, bonded with a polymeric resin binder. Such products are finding wide use as high-strength, high-absorbency materials for disposable items such as consumer and industrial wipes or towels, diapers, surgical packs and gowns, industrial work clothing and feminine hygiene products. They are also used for durable products such as carpet and rug backings, apparel interlinings, automotive components and home furnishings, and for civil engineering materials such as road underlays. There are several ways to apply a binder to these materials, including spraying, print binding, and foam application. Further, depending on the end use, various ingredients such as catalysts, cross-linkers, surfactants, thickeners, dyes, and flame retardant salts may also be incorporated into the binder.

In the high-speed, high-volume manufacture of cellulosic products such as wet wipes, an important binder property is a fast cure rate; that is, the finished product must reach substantially full tensile strength in a very short time after binder application so that production rates are not unduly slowed down. In these products, such a property is usually obtained either by using a binder which is self-cross-linkable or by incorporating an external cross-linker into the binder formulation. The cross-linker or self-cross-linkable binder apparently not only interacts with reactive groups in the binder, but with the hydroxyl groups on the cellulose fibers as well, to quickly form very strong bonds.

As the need for stronger nonwovens developed, a variety of cross-linking agents for the base binders was utilized. N-methylolacrylamide and other similar cross-linkers were incorporated into the binders. While the strength of the nonwovens increased desirably, it was discovered that many of these cross-linking agents, especially N-methylolacrylamide, emitted formaldehyde during use. The toxicity of formaldehyde caused users to search for non-formaldehyde-emitting alternatives, that is, so-called "zero" formaldehyde binders. An example of a non-formaldehyde-emitting cross-linker is methyl acryloamidoglycolate methyl ether (MAGME). However, while MAGME improved the strength of many copolymeric binders and did not emit formaldehyde, the need for further improving the strength, especially the wet strength, of many copolymeric binders led to the use of various other techniques for strength improvement.

One method of providing a fast curing, zero formaldehyde binder for nonwoven cellulosic materials utilized a binder comprising a solution copolymer formed by copolymerizing a mixture of two or more water soluble olefinically unsaturated organic comonomers. The solution copolymer was admixed with a non-formaldehyde-emitting latex to produce a final composition which, when cured on nonwoven cellulosic material, achieved about 80 percent of fully cured wet tensile strength in 8 seconds or less and which had essentially no emission of formaldehyde from the finished nonwoven.

SUMMARY OF THE INVENTION

While the use of solution copolymers resulted in providing zero formaldehyde binders which had improved wet strengths and which were capable of fast curing, it was found that certain solution copolymers may raise the viscosity and cause thickening of the binders in which they are incorporated. In certain applications it is desirable to maintain the viscosity of the binder at a relatively low level in order to assure adequate penetration of the binder into the nonwoven substrate and to facilitate handling of the binder. Although the binder viscosity can be lowered by using a lesser quantity of solution copolymer, this approach may result in a binder of reduced wet strength. Accordingly, in order to provide a low viscosity binder without reducing the strength thereof, a method of providing low viscosity binders which does not depend upon the use of lesser quantities of solution copolymers is needed.

In accordance with the present invention, a low viscosity, high strength, fast curing, zero formaldehyde binder for textile materials is provided. The binder comprises an admixture of an aqueous emulsion copolymer latex and an aqueous solution copolymer, which admixture is formulated to contain a very high proportion of carboxyl groups. The emulsion copolymer latex typically is a non-formaldehyde-emitting copolymer such as a carboxylated copolymer of an alkenyl aromatic compound and a conjugated diolefin. The solution copolymer typically comprises the product of copolymerization of a mixture of one or more copolymerizable olefinically unsaturated polycarboxylic acids and one or more copolymerizable olefinically unsaturated monocarboxylic acids.

DETAILED DESCRIPTION OF THE INVENTION

The present invention comprises a low viscosity, high strength, fast curing, zero formaldehyde binder for textile materials, especially nonwoven cellulosic materials, a process for preparing the binder, an article of manufacture comprising the binder incorporated into a textile substrate, and a method for producing such article of manufacture. The binder, which contains a very high proportion of carboxyl groups, is formulated by mixing an aqueous emulsion copolymer latex with a solution copolymer.

LATEX

The late of the present invention typically comprises a conjugated diolefin copolymer containing about 10 to about 95 weight percent of one or more alkenyl aromatic comonomers and about 5 to about 90 weight percent of one or more conjugated diolefin comonomers having 4 to about 8 carbon atoms. These copolymers can be either random or block interpolymers. Illustrative alkenyl aromatic comonomers include, for example, styrene and substituted styrenes such as alpha-methylstyrene, p-methylstyrene, chlorostyrene and methylbromostyrene. Illustrative conjugated diolefin comonomers include, for example, butadiene, isoprene, 1,3-pentadiene, 2-ethylbutadiene, and 4-methyl-1,3-pentadiene. The alkenyl aromatic comonomer is preferably present in a concentration of about 20 to about 80 weight percent, most preferably about 40 to about 70 weight percent. The conjugated diolefin comonomer is preferably present in a concentration of about 20 to about 80 weight percent, most preferably about 30 to about 60 weight percent.

The conjugated diolefin copolymers can contain various other comonomers in addition to the alkenyl aromatic comonomer and the conjugated diolefin comonomer, such as vinyl esters of carboxylic acids, mono-olefins, olefinically unsaturated nitriles, olefinically unsaturated carboxylic acid esters, or olefinically unsaturated carboxylic acids, which are preferred.

In an especially preferred embodiment, itaconic acid is copolymerized with styren and butadiene. The itaconic acid is typically present in a quantity of about 0.5 percent to about 5 percent by weight of total monomers, the larger quantities being preferred.

The olefinically unsaturated carboxylic acid, such as itaconic acid, can be added at the start of the polymerization or continuously throughout the polymerization.

Other latexes than conjugated diolefin copolymer latexes can be used in the present invention in place of the conjugated diolefin copolymer latexes. For example, acrylic latexes, vinyl acrylic latexes, vinyl chloride latexes, vinyl acetate latexes, vinylidene chloride latexes and nitrile latexes can be used if desired.

An especially preferred group of latexes includes non-formaldehyde emitting styrene-butadiene, carboxylated styrene-butadiene, vinyl acetate/acrylate, and all-acrylat copolymer latexes.

The latexes of the present invention can be prepared by free radical solution and emulsion polymerization methods including batch, continuous and semi-continuous procedures. For the purposes of this invention, free radical polymerization methods are intended to include radiation polymerization techniques. Illustrative free-radical polymerization procedures suitable for preparing aqueous polymer emulsions involve gradually adding the monomer or monomers to be polymerized simultaneously to an aqueous reaction medium containing a free radical catalyst at rates proportional to the respective percentage of each comonomer in the finished copolymer. Optionally, copolymers can be obtained by adding one or more comonomers disproportionately throughout the polymerization so that the portions of the polymers formed during the initial polymerization stages have a comonomer composition different from that formed during the intermediate or later stages of the same polymerization. For instance, a styrene-butadiene copolymer can be formed by adding a greater proportion or all of the styrene during the initial polymerization stages with the greater proportion of the butadiene being added later in the polymerization.

Illustrative free-radical catalysts are free radical initiators such as hydrogen peroxide, potassium or ammonium peroxydisulfate, dibenzoyl peroxide, lauroyl peroxide, ditertiarybutyl peroxide, 2,2'-azobisisobutyronitrile, either alone or together with one or more reducing components such as sodium bisulfite, sodium metabisulfite, glucose, ascorbic acid or erythorbic acid. Ultraviolet and electron beam polymerization methods suitable for initiating free radical polymerizations are discussed in the Handbook of Pressure-Sensitive Adhesive Technology, D. Satas, Ed., Van Nostrand Reinhold Company, New York (1982), particularly at pages 586–604 and the references cited therein. The foregoing references in their entireties are incorporated herein by reference.

Physical stability of the dispersion usually is achieved by providing in the aqueous reaction medium one or more nonionic, aninic, and/or amphoteric surfactants including copolymerizable surfactants such as sulfonated alkylphenol polyalkyleneoxy maleate, sulfoethyl methacrylate, or alkenyl sulfonates. Illustrative of nonionic surfactants are alkylpolyglycol ethers such as ethoxylation products of lauryl, oleyl, or stearyl alcohols or mixtures of alcohols such as coconut fatty alcohols; alkylphenol polyglycol ethers such as ethoxylation products of octyl- or nonylphenol, diisopropylphenol, triisopropylphenol, or di- or tritertiarybutyl phenol. Illustrative of anionic surfactants, for example, are alkali metal or ammonium salts of alkyl, aryl, or alkylaryl sulfonates, sulfates, phosphates or phosphonates. Specific examples include sodium lauryl sulfate, sodium octylphenol glycolether sulfate, sodium dodecylbenzene sulfonate, sodium lauryl diglycol sulfate, ammonium tritertiarybutylphenol penta- and octa-glycol sulfates, dioctyl sodium sulfosuccinate, alpha-olefin sulfonates and sulfonated biphenyl ethers. Numerous other examples of suitable surfactants are disclosed in U.S. Pat. No. 2,600,831, the disclosure of which in its entirety is incorporated herein by reference.

Those skilled in the art of emulsion polymers will appreciate that protective colloids, fillers, extenders, colorants, tackifiers, and other additives which are compatible with the polymer emulsion can be added, if desired.

The polymerization reaction is typically conducted with agitation at a temperature sufficient to maintain an adequate reaction rate until most or all monomers are consumed. Temperatures of about 120° to about 190° F. are generally used. Temperatures of about 150° to about 170° F. are preferred. Monomer addition is usually continued until the latex reaches a polymer concentration of about 20 to about 70 weight percent and preferably about 40 to about 50 weight percent.

A chain transfer agent may be added to the reaction mixture where it is desired to produce a lower molecular weight copolymer. Examples of chain transfer agents, which are added in amounts of about 0.1 to about 5 percent by weight of total monomers, are organic halides such as carbon tetrachloride and tetrabromide, alkyl mercaptans, such as secondary and tertiary butyl mercaptan, and thiol substituted polyhydroxyl alcohols, such as monothiolglycerine.

SOLUTION COPOLYMER

The solution copolymer used with the latex comprises a polymeric composition formed by the solution copolymerization of a mixture containing at least two water soluble comonomers.

The first of these water soluble comonomers has at least one olefinically unsaturated linkage and at least two carboxyl groups, said comonomer having the general formula:

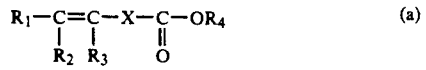

(a)

wherein $R_1$, $R_2$, and $R_3$ are independently hydrogen, halogen, nitro, amino, and organic radicals, usually of no more than 10 carbon atoms; $R_4$ is hydrogen or an organic radical, usually containing no more than about 10 carbon atoms; and X is a covalent bond or an organic radical, usually of no more than about 10 carbon atoms. Normally, the number of all the carbon atoms in comonomer (a) is no greater than 30. Since comonomer (a) contains at least two carboxyl groups, at least one of $R_1$, $R_2$, and $R_3$ must contain a carboxyl group when $R_4$ is hydrogen or an organic radical containing a carboxyl group, and at least two of $R_1$, $R_2$, and $R_3$ must contain carboxyl groups when $R_4$ is other than hydrogen or an organic radical containing a carboxyl group.

The term "organic" radical, when used herein, broadly refers to any carbon-containing radical. Such radicals may be cyclic or acyclic, may have straight or branched chains, and can contain one or more hetero atoms such as sulfur, nitrogen, oxygen, phosphorus, and the like. Further, they may be substituted with one or more substituents such as thio, hydroxy, nitro, amino, cyano, carboxyl or halogen. In addition to aliphatic chains, they may contain aryl radicals, including arylalkyl and alkylaryl radicals; and cycloalkyl radicals, including alkyl-substituted cycloalkyl and cycloalkyl-substituted alkyl radicals, with such radicals, if desired, being substituted with any of the substituents listed above. When cyclic radicals are present, whether aromatic or nonaromatic, it is preferred that they have only one ring. Preferred organic radicals are, in general, free of olefinic and alkynyl linkages and also free of aromatic radicals.

The term "water soluble" shall denote a solubility in an amount of at least 2.5 percent by weight in deionized water at a temperature of about 90° C. Preferably the comonomers are soluble in water to the extent of at least 5 percent, and most preferably at least 15 percent by weight.

In comonomer (a), it is preferred that $R_1$, $R_2$, and $R_3$ be hydrogen or unsubstituted cycloalkyl or unsubstituted, straight or branched chain alkyl radicals which have no more than 7 carbon atoms, with the exception that at leas of $R_1$, $R_2$, and $R_3$ must either be or bear a group,

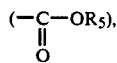

wherein $R_5$ is hydrogen or an organic radical, usually having no more than about 10 carbon atoms. In any event, compound (a) must contain at least two carboxyl groups.

More preferably, $R_1$, $R_2$, and $R_3$, except for the group or groups being or bearing the carboxyl or carboxylate group or groups, are hydrogen or unsubstituted, straight or branched chain alkyl radicals having no more than 5 carbon atoms. When X is an organic radical, it preferably has no more than 6 carbon atoms and is an unsubstituted, branched or unbranched chain alkyl or unsubstituted cycloalkyl radical and, when an alkyl radical, is most preferably unbranched.

In the most preferred form of all, comonomer (a) is a dicarboxylic acid wherein $R_1$, $R_2$, and $R_3$ are all independently hydrogen, carboxyl groups, or methyl or ethyl radicals, either unsubstituted or substituted with a carboxyl group, provided that $R_1$, $R_2$, and $R_3$ comprise, in total, one carboxyl group where $R_4$ is hydrogen or an organic radical containing a carboxyl group and two carboxyl groups where $R_4$ is other than hydrogen or an organic radical containing a carboxyl group. Most preferred for $R_4$ and $R_5$ are hydrogen or unsubstituted alkyl radicals or unsubstituted cycloalkyl radicals. Most preferred for X is a covalent bond.

In particular regard to the most preferred embodiment of the water-soluble comonomer (a), it is preferred that, except for the carboxyl and carboxylate groups, the remainder of the compound be unsubstituted, that is, consist of only carbon and hydrogen atoms, and that the maximum number of carbon atoms in the compound be 27; with $R_1$ and $R_2$ combined having no more than 9 carbon atoms, and $R_3$ no more than 8 carbon atoms; with $R_4$ and R having no more than 7 carbon atoms. In the very most preferred embodiment, each side of the olefinic linkage has no more than about 5 carbon atoms and both of $R_4$ and $R_5$ are hydrogen.

Suitable copolymerizable, water-soluble comonomers (a) according to the above most preferred description include monoolefinically unsaturated diacids, such as methylenesuccinic acid (itaconic acid), the cis- and trans- forms of butenedioic acid (maleic and fumaric acids), both the cis- and trans- forms (where such exist) of the diacids resulting when one or more of the hydrogen atoms on the carbon chains of maleic/fumaric acid or itaconic acid is replaced with a methyl or ethyl radical. and the $C_1$ to $C_5$ semi-esters thereof. Of these, itaconic acid is most preferred.

The second of these water soluble comonomers has at least one olefinically unsaturated linkage and a single carboxyl group, said comonomer having the general formula:

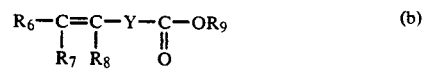

wherein $R_6$, $R_7$, and $R_8$ are independently hydrogen, halogen, nitro, amino, and organic radicals, usually of no more than 10 carbon atoms; $R_9$ is hydrogen or an organic radical, usually containing no more than about 10 carbon atoms; and Y is a covalent bond or an organic radical, usually of no more than about 10 carbon atoms. Normally, the number of all the carbon atoms in comonomer (b) is no greater than 30. Since comonomer (b) contains a single carboxyl group, none of $R_6$, $R_7$, and $R_8$ can contain a carboxyl group where $R_9$ is hydrogen or an organic radical containing a carboxyl group, and only one of $R_6$, $R_7$, and $R_8$ can contain a carboxyl group where $R_9$ is other than hydrogen or an organic radical containing a carboxyl group.

In comonomer (b), it is preferred that $R_6$, $R_7$, and $R_8$ be hydrogen or unsubstituted cycloalkyl or unsubstituted, straight or branched chain alkyl radicals which have no more than 7 carbon atoms, with the exception that, where $R_9$ is other than hydrogen or an organic radical containing a carboxyl group, one of $R_6$, $R_7$, and $R_8$ may either be or bear a carboxyl group. In any event, compound(b) must contain only one carboxyl group.

More preferably $R_6$, $R_8$, and $R_8$, except for the group being or bearing the carboxyl group, are hydrogen or unsubstituted, straight or branched chain alkyl radicals having no more than 5 carbon atoms. When Y is an organic radical, it preferably has no more than 6 carbon atoms and is an unsubstituted, branched or unbranched chain alkyl or unsubstituted cycloalkyl radical and, when an alkyl radical, is most preferably unbranched.

In the most preferred form of all, comonomer (b) is a monocarboxylic acid wherein $R_6$, $R_7$, and $R_8$ are all independently hydrogen or methyl or ethyl radicals, either unsubstituted or substituted with a carboxyl group, provided that $R_6$, $R_7$, and $R_8$ comprise, in total, one carboxyl group where $R_9$ is other than hydrogen or an organic radical containing a carboxyl group. Most preferred for $R_9$ are hydrogen or unsubstituted alkyl or cycloalkyl radicals. Most preferred for Y is a covalent bond.

In particular regard to the most preferred embodiment of the water-soluble comonomer (b), it is still more preferred that, except for the carboxyl and carboxylate groups, the remainder of the compound be unsubstituted, that is, consist of only carbon and hydrogen atoms, and that the maximum number of carbon atoms in the compound be 27; with $R_6$ and $R_7$ combined having no more than 9 carbon atoms, and $R_8$ no more than 8 carbon atoms; with $R_9$ having no more than 7 carbon atoms. In the very most preferred embodiment, each side of the olefinic linkage has no more than about 5 carbon atoms and $R_9$ is hydrogen.

Suitable copolymerizable, water-soluble comonomers (b) according to the above most preferred description include monoolefinically unsaturated monocarboxylic acids, such as acrylic acid and methacrylic acid.

Where comonomers (a) and (b) are copolymerized to form a solution copolymer, that is, where an olefinically unsaturated polycarboxylic acid is copolymerized with an olefinically unsaturated monocarboxylic acid, a comonomeric mixture comprising between about 40% and about 75% of comonomer (a), particularly the dicarboxylic acid forms thereof, and about 25% to about 60% of comonomer (b) has been found to be particularly effective in producing a solution copolymer which can be formulated with an emulsion copolymer latex to produce the low viscosity, high strength, fast curing, zero formaldehyde binders of the present invention. More preferred is a comonomeric mixture comprising between about 50% and about 65% of comonomer (a) and about 35% to about 50% of comonomer (b). With respect to the most preferred embodiments of comonomers (a) and (b), comonomeric mixtures containing about 40% to about 50% itaconic acid and about 50% to about 60% acrylic acid have been found most useful, since comonomeric mixtures containing itaconic acid contents greater than about 50% have been found difficult to polymerize. With methacrylic acid as the comonomer, on the other hand, it has been found feasible to copolymerize mixtures containing more than about 50% itaconic acid, in fact, as much as about 60% to about 75% itaconic acid with about 25% to about 40% methacrylic acid.

Although it is preferred to copolymerize a mixture containing comonomers (a) and (b) exclusively, in some instances it may be desirable to utilize one or more additional comonomers in relatively small amounts. Thus, for example, the solution copolymeric composition may optionally contain about 0.1 weight percent to about 20 weight percent of one or more polymerizable, monoolefinically unsaturated nonionic comonomers to serve as extenders, $T_g$ modifiers, and the like, without significantly degrading the basic properties of the copolymer. Suitable additive comonomers for such purposes include the $C_1$ to $C_5$ saturated esters of acrylic and methacrylic acid, vinylidene chloride and vinyl compounds such as vinyl chloride, vinyl acetate, styrene, and the like. Preferred additive monomers are ethyl acrylate, butyl acrylate and styrene.

Suitable copolymers of comonomers (a) and (b) can be prepared by either thermal or, preferably, free-radical initiated solution polymerization methods. Further, the reaction may be conducted by batch, semibatch, or continuous procedures, which are well known for use in conventional polymerization reactions. Where free-radical polymerization is used, illustrative procedures suitable for producing aqueous copolymer solutions typically involve gradually adding simultaneously the comonomers to be copolymerized to an aqueous reaction medium at rates proportional to the respective percentage of each comonomer in the finished copolymer and initiating and continuing said copolymerization with a suitable polymerization catalyst. Optionally, one or more of the comonomers can be added disproportionately throughout the polymerization so that the copolymer formed during the initial stages of copolymerization will have a composition differing from that formed during the intermediate and later stages of the same copolymerization.

Illustrative water-soluble, free-radical initiators are hydrogen peroxide and an alkali metal (sodium, potassium, or lithium) or ammonium persulfate, or a mixture of such an initiator in combination with a reducing agent activator, such as a sulfite, more specifically an alkali metabisulfite, hyposulfite or hydrosulfite; or glucose, ascorbic acid, erythorbic acid or other reducing agent, to form a "redox" system. Normally the amount of initiator used ranges from about 0.01 percent to about 5 percent, by weight, based on the comonomer charge. In a redox system, a corresponding range (about 0.01 to about 5 percent) of reducing agent is normally used.

The copolymerization, once started, is continued, with agitation, at a temperature sufficient to maintain an adequate reaction rate until most, or all, of the comonomers are consumed and until the solution reaches a polymer solids concentration between about 5 percent and about 40 percent, by weight. Reaction temperatures in the range of about 10° C. to about 100° C. will yield satisfactory polymeric compositions. When persulfate systems are used, the solution temperature is normally in the range of about 60° C. to about 100° C, while in redox systems, the temperature is normally in the range of about 10° C. to about 70° C, and preferably about 30° C. to about 60° C. At this point, the solution normally will have a viscosity in the range between about 10 cps and about 1000 cps at a solids content of 15 percent at pH 3.

In general, the solution copolymer is used with the emulsion polymer latex in an amount of about 1 percent to about 20 percent dry weight. Preferably, the solution copolymer is present in a concentration of about 2 percent to about 5 percent. The desired amount of solution copolymer is added to the emulsion polymer latex and the pH of the resulting blend is adjusted to about pH 5 to about pH 9 prior to using as a binder.

Textile substrates useful in the articles of this invention include assemblies of fibers, preferably fibers which contain polar functional groups. Significantly greater improvements in tensile strength and other physical properties are achieved by application of the binders of the present invention to natural or synthetic polar group-containing fibers in contrast to relatively nonpolar fibers such as untreated, nonpolar polyolefin fibers. However, such nonpolar fibers also can be employed. Furthermore, polar groups, such as carbonyl (e.g., keto) and hydroxy groups, can be introduced into polyolefins, styrene-butadiene polymers and other relatively nonpolar fibers by known oxidation techniques, and it is intended that such treated polymers can be employed in the articles and methods of this invention.

For the purposes of this invention, it is intended that the term "fibers" encompass relatively short filaments or fibers as well as longer fibers often referred to as "filaments." Illustrative polar functional groups contained in suitable fibers are hydroxy, etheral, carbonyl, carboxylic acid (including carboxylic acid salts), carboxylic acid esters (including thio esters), amides, amines etc. Essentially all natural fibers include one or more polar functional groups. Illustrative are virgin and reclaimed cellulosic fibers such as cotton, wood fiber, coconut fiber, jute, hemp, etc., and protenaceous materials such as wool and other animal fur. Illustrative synthetic fibers containing polar functional groups are polyesters, polyamides, carboxylated styrene-butadiene polymers, etc. Illustrative polyamides include nylon-6, nylon-66, nylon-610, etc.; illustrative polyesters include "Dacron," "Fortrel," and "Kodel"; illustrative acrylic fibers include "Acrilan," "Orlon," and "Creslan." Illustrative modacrylic fibers include "Verel" and "Dynel." Illustrative of other useful fibers which are also polar are synthetic carbon, silicon, and magnesium silicate (e.g., asbestos) polymer fibers and metallic fibers such as aluminum, gold, and iron fibers.

These and other fibers containing polar functional groups are widely employed for the manufacture of a vast variety of textile materials including wovens, nonwovens, knits, threads, yarns, and ropes. The physical properties of such articles, in particular tensile strength, abrasion resistance, scrub resistance, and/or shape retention, can be increased by addition of the binders of the present invention with little or no degradation of other desirable properties such as hand, flexibility, elongation, and physical and color stability.

The binders of the present invention can be applied to the selected textile material by any one of the procedures employed to apply other polymeric materials to such textiles. Thus, the textile can be immersed in the binder dispersion in a typical dip-tank operation, sprayed with the binder dispersion, or contacted with rollers or textile "printing" apparatus employed to apply polymeric dispersions and solutions to textile substrates.

The concentration of binder in the applied dispersion can vary considerably depending primarily upon the application apparatus and procedures employed and desired total polymer loading (polymer content of finished textile). Thus, binder concentration can vary from as low as about 1 percent to as high as 60 percent or more, although most applications involve the use of dispersions containing about 5 to about 60 weight percent solids.

Textile fiber assemblies wetted with substantial quantities of binder are typically squeezed with pad roll, nip roll, and/or doctor blade assemblies to remove excess dispersion and, in some instances, to "break" and coalesce the polymer or polymers constituting the binder and improve polymer dispersion and distribution and binder-fiber wetting. The binder-containing fiber assembly can then be allowed to cure at ambient temperature by evaporation of solvent or water, although curing i typically accelerated by exposure of the binder-containing fiber assembly to somewhat elevated temperatures such as 90° C. to 200° C. One particular advantage of the binders of the present invention is that they cure relatively fast. Thus, bond strength between the binder and fibers, and thus, between respective fibers, develops quickly.

Rapid cure rate is important in essentially all methods of applying polymers to textiles since it is generally desirable to rapidly reduce surface tackiness and increase fiber-to-fiber bond strength. This is particularly true in the manufacture of loose woven textiles, knits, and nonwovens, including all varieties of paper. Most often, adequate bond strength and sufficiently low surface tackiness must be achieved in such textiles before they can be subjected to any significant stresses and/or subsequent processing. While cure rate can be increased with more severe curing conditions, i.e., using higher temperatures, such procedures require additional equipment, increased operating costs, and are often unacceptable due to adverse effects of elevated temperatures on the finished textile.

The binder content of the finished textile an vary greatly depending on the extent of improvement in physical properties desired. For instance, very minor amounts of binder are sufficient to increase tensile strength, shape retention, abrasion resistance (wear resistance), and/or wet-scrub resistance of the textile fiber assembly. Thus, binder concentrations of at least about 0.1 weight percent, generally at least about 0.2 weight percent, are sufficient to obtain detectable physical property improvements in many textiles. However, most applications involve binder concentrations of at least about 1 weight percent and preferably at least about 2 weight percent based on the dry weight of the finished binder-containing textile article. Binder concentrations of about 1 to about 95 weight percent can be employed, while concentrations of about 1 to about 30 weight percent based on finished textile dry weight are most common.

The product property in which the most significant improvement results depends, at least to some extent, on the structure of the treated fiber assemblage. For instance, threads and ropes formed from relatively long, tightly wound or interlaced fibers and tightly woven textiles generally possess significant tensile strength in their native state, and the percentage increase in tensile strength resulting from incorporation of binder will be less, on a relative basis, than it is with other products such as loose-wovens, knits, and non-wovens. More specifically, significant improvements in abrasion resistance and scrub resistance are achieved in threads, ropes, and tightly woven textiles, and significant improvement in tensile strength (both wet and dry) can be realized in such products which are manufactured from relatively short fibers and which thus have a relatively lower tensile strength in their native form. Usually the most significant improvements sought in loose-woven textiles are shape retention (including retention of the relative spacing of adjacent woven strands), abrasion resistance, and scrub resistance, and these improvements can be achieved by the methods and with the articles of this invention. Similar improvements are also obtained in knitted fabrics.

The most significant advantages of the useful methods and textile articles are in the field of non-wovens. Non-wovens depend primarily on the strength and persistence of the fiber-binder bond for their physical properties and for the retention of such properties with use. Bonded non-woven fabrics, such as the textile articles of this invention, can be defined generally as assemblies of fibers held together in a random or oriented web or mat by a bonding agent. While many non-woven materials are manufactured from crimped fibers having lengths of about 0.5 to about 5 inches, shorter or longer fibers can be employed. The utilities for such non-wovens range from hospital sheets, gowns, masks, and bandages to roadbed underlayment supports, diapers, roofing materials, napkins, coated fabrics, papers of all varieties, tile backings (for ungrouted tile prior to installation), and various other utilities too numerous for detailed listing. Their physical properties range all the way from stiff, board-like homogeneous and composite paper products to soft drapeable textiles (e.g., drapes and clothing), and wipes. The myriad variety of non-woven products can be generally divided into categories characterized as "flat goods" and "highloft" goods, and each category includes both disposable and durable products. Presently, the major end uses of disposable flat goods non-wovens include diaper cover stock, surgical drapes, gowns, face masks, bandages, industrial work clothes, and consumer and industrial wipes and towels such as paper towels, and feminine hygiene products. Current major uses of durable flat goods non-wovens include apparel interlinings and interfacings, drapery and carpet backings, automotive components (such as components of composite landau automobile tops), carpet and rug backings, and construction materials, such as roadbed underlayments employed to retain packed aggregate, and components of composite roofing materials, insulation, pliable or flexible siding and interior wall and ceiling finishes, etc.

The so-called "highloft" non-wovens can be defined broadly as bonded, non-woven fibrous structures of varying bulks that provide varying degrees of resiliency, physical integrity, and durability depending on end use. Currently, major uses of highloft non-wovens include the manufacture of quilts, mattress pads, mattress covers, sleeping bags, furniture underlayments (padding), air filters, carpet underlayments (e.g., carpet pads), winter clothing, shoulder and bra pads, automotive, home, and industrial insulation and paddings, padding and packaging for stored and shipped materials and otherwise hard surfaces (e.g., automobile roof tops, chairs, etc.), floor care pads for cleaning, polishing, buffing, and stripping, house robes (terrycloth, etc.), crib kick pads, furniture and toss pillows, molded packages, and kitchen and industrial scrub pads.

The binders and methods can be used to manufacture all such non-wovens, and they are particularly useful for the manufacture of non-wovens free of, or having reduced levels of formaldehyde or other potentially toxic components and which have relatively high wet and dry tensile strength, abrasion resistance, color stability, stability to heat, light, detergent, and solvents, flexibility, elongation, shape retention, and/or acceptable "hand." They are also particularly useful in manufacturing methods which require relatively short cure time (rapid bonding rate), relatively high binder-to-fiber adhesion, temperature stability (during curing and subsequent treatment), and/or the use of slightly acidic, neutral or alkaline application solutions or dispersions.

The binder compositions can also be employed to bind two or more substrates to each other or to coat such substrates and, thus, can be employed as coatings and adhesives for forming laminates or other composite articles and for assembling adhesive-bound structures. Illustrative of such uses are binding or formation of laminates of substrates such as acrylates, terephthalates, cellulosics (e.g., wood, paper, etc.), phenolic resins, urethane, metals, and the like; adhering carpet backing to tufted or woven carpets, bonding vapor barriers (plastic films) to insulation, wall board, etc., adhering tiles or other wall or floor coverings to concrete, wallboard, wood or other structural materials, application of wood veneers to wood or composite backings, and numerous other similar adhesive applications.

When the binder compositions are used as coatings for any one of a variety of substrates, such as those identified immediately above, they may also contain one or more other ingredients, if desired, so long as such ingredients do not prevent hardening, or the compositions can be employed simply as clear coatings. Illustrative, optional ingredients include colorants, such as dyes and pigments, heat and ultra-violet stabilizers, accelerators for hardening the copolymers constituting the binders of the present invention, plasticizers, etc. Films and coatings may then be deposited, for example, by Weir coating, i.e. application of the binder from a bath thereof having a controlled overflow, or by brush, spray or doctor- or air-knife coating, by dip coating, etc., and the products may then be cured at ambient or elevated temperatures. Binder concentrations suitable for use in coatings and adhesives are similar to those described hereinabove for textile binders. However, most binding applications, other than textile binding, and coating applications, such as clear coatings and paints, will generally involve binder concentrations of at least about 5 weight percent, typically at least about 10 weight percent of the total composition.

The invention will be further described in the following examples which are illustrative of specific modes of practicing the invention and are not intended to limit the scope of the invention as defined in the claims. All percentages are by weight unless otherwise specified. All "parts" of solutions refer to dry weights of the specified active component, rather than "wet" weights.

EXAMPLE 1

A styrene-butadiene-itaconic acid copolymer latex was prepared by adding to a pressure reactor with constant stirring 34.7 parts water, 1 part itaconic acid, 0.8 part of a 10% solution of Aerosol A-196 surfactant (sodium dicyclohexyl sulfosuccinate available from American Cyanamid Co., Wayne, N.J.), and 1 part of a polystyrene seed, 25 nm particle size. The mixture was heated to 165° F and 0.2 part sodium persulfate was added to initiate the reaction. Then 40 parts butadiene, 60 parts styrene, 1.0 part Sulfole 120 mercaptan (tertiary dodecyl mercaptan available from Phillips Chemical Co., a subsidiary of Phillips Petroleum Co., Bartlesville, Okla.) dissolved in styrene, an additional 0.5 part sodium persulfate, an additional 1.5 parts Aerosol A-196, 0.03 part Versene 100 (sodium ethylene diamine tetraacetate available from Dow Chemical Co., Midland, Mich.), 4 parts itaconic acid, and 58.5 parts water were added over a 6 hour period. The final mixture was heated at a temperature of 190° F for 5 hours. The resulting emulsion polymer was cooled and removed from the reactor. It had a pH value of 2.2, which was adjusted to pH 7.0 with ammonium hydroxide. Total solids were 44.1 percent. Viscosity was measured with a Brookfield Model RVF viscometer at 20 rpm and found to be 360 cps. Average particle size was 122 nm.

EXAMPLE 2

A solution copolymer was prepared by heating a mixture of 146 grams itaconic acid, 146 grams acrylic acid, and 1121 grams deionized water to a temperature of 80° C. and adding 2.9 grams ammonium persulfate dissolved in 26.2 grams deionized water. The resulting mixture was then maintained at 80° C. Additional 2.9 gram quantities of ammonium persulfate dissolved in 26.2 grams deionized water were added after 3 hours and after 4 hours. After 6 hours the pH value of the resultant solution copolymer was adjusted to pH 4.0 with concentrated ammonium hydroxide. The solution copolymer was then cooled and filtered. Viscosity was 33 cps at 18% total solids.

The following example illustrates the preparation of a binder according to the present invention.

EXAMPLE 3

The solution copolymer of Example 2 was mixed with the emulsion polymer latex of Example 1 in a concentration of 4% by weight based on the emulsion copolymer latex and the pH was adjusted to pH 6 with sodium hydroxide and then to pH 9 with ammonium hydroxide. Viscosity was 17 cps at 25% total solids, 187 cps at 30% total solids, and 864 cps at 35% total solids. Wet tensile strength was measured by padding Whatman No. 4 paper and curing between metal plates at 188–C for periods of 4 seconds, 6 seconds, and 8 seconds, and at 150–C for 180 seconds. The wet tensile strength is reported as the percentage of the wet tensile strength obtained under the same conditions with a widely used reference commercial cellulose binder composition comprising a carboxylated SBR latex (53.4 % butadiene, 43.7 % styrene, 1.9 % N-methylol acrylamide, and 0.5% each of acrylamide and itaconic acid) cross-linked with 6% methoxymethyl melamine (Cymel 303). The wet tensile strength after curing was found to be 74% at 4 seconds, 92% at 6 seconds, 103% at 8 seconds, and 129% at 180 seconds.

The results obtained in the foregoing example show that a binder viscosity of less than about 20 cps at 25% total solids, less than about 200 cps at 30% total solids, and less than about 900 cps at 35% total solids can be realized using a solution copolymer obtained by polymerizing equal parts of itaconic acid and acrylic acid in accordance with the present invention. The results also show that wet tensile strengths of about 75% to about 130% of those obtained using a standard formaldehyde emitting reference binder can be realized.

The following example illustrates the effect on viscosity of using various concentrations of solution copolymer in the binders of the present invention.

EXAMPLE 4

The solution copolymer of Example 2 was mixed with an emulsion copolymer similar to the emulsion copolymer of Example 1 except that 0.5 part itaconic acid was added to the pressure reactor with an additional 4.5 parts being added over a 6 hour period and ammonium persulfate was used instead of sodium persulfate. The concentrations of solution copolymer used and the viscosities of the mixtures at various percentages of total solids are shown in Table 1.

TABLE 1

| Solution Copolymer, % | Viscosity, cps at % Total Solids | | |
|---|---|---|---|
| | 25% | 30% | 35% |
| 2 | 12 | 13 | 19 |
| 3 | 12 | 18 | 318 |
| 4 | 16 | 255 | 902 |

The foregoing results show that binder viscosities of less than about 20 cps can be obtained with a concentration of solution copolymer of up to 4% at 25% total solids, up to 3% at 30% total solids, and up to 2% at 35% total solids using a solution copolymer containing 50% itaconic acid and 50% acrylic acid.. These results also show that viscosities of less than about 260 cps can be obtained with a concentration of solution copolymer of up to 4% at 30% total solids, less than about 320 cps with a concentration of solution copolymer of up to 3% at 35% total solids, and less than about 900 cps with a concentration of solution copolymer of up to 4% at 35% total solids.

The following example illustrates the use in the binders of the present invention of solution copolymers obtained by copolymerizing mixtures of itaconic acid and methacrylic acid.

EXAMPLE 5

A solution copolymer was prepared by heating a mixture of 189 grams itaconic acid, 102 grams methacrylic acid, and 1121 grams deionized water to a temperature of 80° C. and adding 2.9 grams ammonium persulfate dissolved in 26.2 grams deionized water. The resulting mixture was then maintained at 80° C. Additional 2.9 gram quantities of ammonium persulfate dissolved in 26.2 grams deionized water were added after 3 hours and after 4 hours. After 6 hours the pH value of the resultant solution copolymer was adjusted to pH 4.0 with concentrated ammonium hydroxide. The solution copolymer was then cooled and filtered. Viscosity was 100 cps at 17% total solids.

In addition to the above solution copolymer, which was prepared by copolymerizing a mixture containing 65% itaconic acid and 35% methacrylic acid, copolymers produced from mixtures containing various other ratios of itaconic acid to methacrylic acid were found to have the viscosities shown in Table 2.

TABLE 2

| Ratio of Itaconic Acid to Methacrylic Acid | Viscosity, cps |
|---|---|
| 45.5:55.5 | 15,500 |
| 50:50 | 5,380 |
| 55:45 | 1,320 |
| 60:40 | 370 |
| 65:35 | 100 |
| 70:30 | 48 |

The foregoing results show that the viscosities of solution copolymers polymerized from mixtures of itaconic acid and methacrylic acid vary as the ratio of itaconic acid to methacrylic acid changes, with the viscosities decreasing with increasing itaconic acid content.

The following example illustrates the effect on binder viscosity of using some of the itaconic acid-methacrylic acid solution copolymers of Example 5.

EXAMPLE 6

Solution copolymers containing various ratios of itaconic acid to methacrylic acid were mixed with the emulsion copolymer latex of Example 4 in various concentrations. The viscosities were measured at various total solids contents. The compositions and concentrations of the solution copolymers, the total solids contents of the resulting binders, and the binder viscosities are shown in Table 3.

TABLE 3

| Itaconic Acid: Methacrylic Acid | Solution Copolymer % | Viscosity, cps at % Total Solids | | |
|---|---|---|---|---|
| | | 25% | 30% | 35% |
| 65:35 | 3 | 13 | 23 | 360 |
| 65:35 | 4 | — | 225 | 760 |
| 70:30 | 3 | 12 | 18 | 172 |
| 70:30 | 4 | — | 170 | 636 |

The foregoing results show that binder viscosities of less than about 25 cps can be obtained with a concentration of solution copolymer of up to 3% at 30% total solids, less than about 230 cps with a concentration of solution copolymer of up to 4% at 30% total solids, less than about 360 cps with a concentration of solution copolymer of up to 3% at 35% total solids, and less than about 760 cps with a concentration of solution copolymer of up to 4% at 35% total solids can be realized by the use of solution copolymers containing 65% itaconic acid and 35% methacrylic acid or 70% itaconic acid and 30% methacrylic acid.

The binders of the present invention are characterized by low viscosities. In general, viscosities in the range of about 2 cps at 25% total solids to about 1000 cps at 35% total solids depending upon the solution copolymer content of the binder can be realized by using aqueous solution copolymers produced by copolymerizing mixtures of olefinically unsaturated polycarboxylic acids and olefinically unsaturated monocarboxylic acids in accordance with the present invention. Especially preferred are viscosities of under about 20 cps, which are realizable at up to 35% total solids with 2% solution polymer content and up to 30% with 4% solution copolymer content. The binders of the present invention do not emit formaldehyde and are fast curing. While they have unexpectedly low viscosities, the binders of the present invention display satisfactory tensile strengths compared to binders obtained by using formaldehyde-emitting cross-linking agents.

This invention may be embodied in other forms without departing from the spirit or essential characteristics thereof. For example, it is recognized that while the description of the present invention and the preferred embodiments thereof are all directed toward binders incorporating a solution copolymer which is the product of copolymerization of an olefinically unsaturated polycarboxylic acid and an olefinically unsaturated monocarboxylic acid, there are applications wherein the inclusion of an additional comonomer capable of imparting specific properties to the resulting copolymer and in turn to the binder formulated with such copolymer may be desirable. Consequently, the present embodiments and examples are to be considered only as being illustrative and not restrictive, with the scope of the invention being indicated by the appended claims. All embodiments which come within the scope and equivalency of the claims are, therefore, intended to be embraced therein.

I claim:

1. A fast-curing binder for textile substrates comprising an admixture of an aqueous emulsion copolymer latex and the product of copolymerization, in aqueous solution, of a mixture comprising;

one or more first water-soluble comonomers having the general formula:

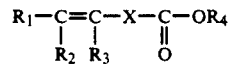

wherein $R_1$, $R_2$, and $R_3$ are independently selected from the group consisting of hydrogen, halogen, nitro, amino, and organic radicals; $R_4$ is hydrogen; and X is a covalent bond or an organic radical; each of said one or more first water-soluble comonomers containing at least two carboxyl groups; and one or more second water-soluble comonomers having the general formula;

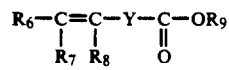

wherein $R_6$, $R_7$, $R_8$ are independently selected from the group consisting of hydrogen, halogen, nitro, amino, and organic radicals; $R_9$ is hydrogen; and Y is a covalent bond or an organic radical; each of said one or more second water-soluble comonomers containing a single carboxyl group;

said one or more first water-soluble comonomers being present in said mixture in a concentration of about 40% to about 75% by weight of total monomers;

said one or more second water-soluble comonomers being present in said mixture in a concentration of about 25% to about 60% by weight of total monomers;

said product of copolymerization being present in said admixture in a concentration of about 1% to about 20%, by dry weight of said latex.

2. A binder according to claim 1 wherein said latex is selected from the group consisting of non-formaldehyde emitting alkenyl aromatic/conjugated diolefin, vinyl acetate/acrylate, and all-acrylate copolymer latexes.

3. A binder according to claim 1 wherein said first water-soluble comonomer is present in said mixture in a concentration of about 50% to about 65% and said second water-soluble comonomer is present in said mixture in a concentration of about 35% to about 50%.

4. A binder according to claim 1 wherein said product of copolymerization is admixed with said non-formaldehyde emitting aqueous emulsion copolymer latex in an amount of about 2% to about 5%, by dry weight of said latex.

5. A fast-curing, zero formaldehyde binder for textile substrates comprising an admixture of a non-formaldehyde emitting aqueous emulsion copolymer latex selected from the group consisting of alkenyl aromatic/conjugated diolefin, vinyl acetate/acrylate and all-acrylate copolymer latexes, and the product of copolymerization, in aqueous solution, of a mixture comprising:

one or more first water soluble comonomers selected from the group consisting of the cis and trans forms of butenedioic acid and methylenesuccinic acid, the diacids resulting when one or more of the hydrogen atoms on the carbon chains of butenedioic acid or methylenesuccinic acid is replaced with methyl or ethyl groups, and the $C_1$ to $C_5$ semi-esters of said acids; and one or more second water soluble comonomers selected from the group consisting of acrylic acid and methacrylic acid;

said product of copolymerization being admixed with said latex in an amount of about 1% to about 20%, by dry weight, based on the dry weight of said latex, said first water-soluble comonomer being present in said mixture in a concentration of about 40% to about 75% by weight of total monomers and said second water-soluble comonomer being present in said mixture in a concentration of about 25% to about 60% by weight of total monomers.

6. A binder according to claim 5 wherein said first water-soluble comonomer is present in said mixture in a concentration of about 50% to about 65% by weight of total monomers and said second water-soluble comonomer is present in said mixture in a concentration of about 35% to about 50% by weight of total monomers.

7. A fast-curing, zero formaldehyde binder for textile substrates comprising an admixture of the product of copolymerization, in aqueous solution, of a mixture of comonomers comprising itaconic acid and acrylic acid, said mixture comprising about 40% to about 50%, by weight of total monomers, of itaconic acid, and about 50% to about 60%, by weight of total monomers, of acrylic acid, with a non-formaldehyde emitting aqueous emulsion copolymer latex selected from the group consisting of alkenyl aromatic/conjugated diolefin, vinyl acetate/acrylate and all-acrylate copolymer latexes, in an amount of about 2% to about 5%, by dry weight, based on the dry weight of said latex.

8. A fast-curing, zero formaldehyde binder for textile substrates comprising an admixture of the product of copolymerization, in aqueous solution, of a mixture of comonomers comprising itaconic acid and methacrylic acid, said mixture comprising about 60% to about 75%, by weight of total monomers, of itaconic acid, and about 25% to about 40% of methacrylic acid, with a non-formaldehyde emitting aqueous emulsion copolymer latex selected from the group consisting of alkenyl aromatic/conjugated diolefin, vinyl acetate/acrylate and all-acrylate copolymer latexes, in an amount of about 2% to about 5%, by dry weight, based on the dry weight of said latex.

9. A fast-curing, zero formaldehyde binder for textile substrates comprising an admixture of the product of copolymerization, in aqueous solution, of a mixture of comonomers comprising about 40% to about 75%, by weight of total monomers, of itaconic acid, the balance of said mixture comprising a member selected from the group consisting of acrylic acid and methacrylic acid, with a non-formaldehyde emitting aqueous emulsion copolymer latex selected from alkenyl aromatic/conjugated diolefin, vinyl acetate/acrylate and all-acrylate copolymer latexes, in an amount between about 2% and about 5%, by dry weight, based on the dry weight of said latex.

10. A binder according to claim 7 wherein said latex is a carboxylated styrene-butadiene copolymer latex containing about 0.5% to about 5% of itaconic acid, by weight of total monomers.

11. A binder according to claim 1 wherein said mixture additionally contains about 0.1% to about 20% by weight of one or more polymerizable, monoolefinically unsaturated nonionic comonomers.

12. A binder according to claim 11 wherein said one or more polymerizable, monoolefinically unsaturated nonionic comonomers is selected from the group consisting of the $C_1$ to $C_5$ saturated esters of acrylic acid and methacrylic acid, vinylidene chloride, vinyl chloride, vinyl acetate, and styrene.

13. A binder according to claim 1 having a viscosity of less than about 20 cps.

14. A binder according to claim 1 wherein the viscosity of said binder is in the range of about 2 cps at 25% total solids to about 1000 cps at 35% total solids.

15. The binder of claim 1 wherein the latex comprises a non-formaldehyde emitting alkenyl aromatic/conjugated diolefin copolymer latex.

16. The binder of claim 1 wherein the latex comprises a non-formaldehyde emitting styrene-butadiene copolymer latex.

17. The binder of claim 1 wherein the latex comprises a non-formaldehyde emitting carboxylated styrene-butadiene copolymer latex.

18. The binder of claim 1 wherein the latex comprises a non-formaldehyde emitting vinyl acetate/acrylate copolymer latex.

19. The binder of claim 1 wherein the latex comprises a non-formaldehyde emitting all-acrylate copolymer latex.

20. The binder of claim 1 wherein the first water-soluble comonomer is present in the mixture in a concentration of about 40% to about 50% by weight of total monomers and the second water-soluble comonomer is present in the mixture in a concentration of about 50% to about 60% by weight of total monomers.

21. The binder of claim 1 wherein the mixture comprises about 40% to about 50% itaconic acid by weight of total monomers and about 50% to about 60% acrylic acid by weight of total monomers.

22. The binder of claim 1 wherein the first water-soluble comonomer is present in the mixture in a concentration of about 60% to about 75% by weight of total monomers and the second water-soluble comonomer is present in the mixture in a concentration of about 25% to about 40% by weight of total monomers.

23. The binder of claim 1 wherein the mixture comprises about 60% to about 75% itaconic acid by weight of total monomers and about 25% to about 40% methacrylic acid by weight of total monomers.

24. The binder of claim 5 wherein the latex comprises a non-formaldehyde emitting alkenyl aromatic/conjugated diolefin copolymer latex.

25. The binder of claim 5 wherein the latex comprises a non-formaldehyde emitting styrene-butadiene copolymer latex.

26. The binder of claim 5 wherein the latex comprises a non-formaldehyde emitting carboxylated styrene-butadiene copolymer latex.

27. The binder of claim 5 wherein the latex comprises a non-formaldehyde emitting vinyl acetate/acrylate copolymer latex.

28. The binder of claim 5 wherein the latex comprises a non-formaldehyde emitting all-acrylate copolymer latex.

29. The binder of claim 5 wherein the first water-soluble comonomer is present in the mixture in a concentration of about 40% to about 50% by weight of total monomers and the second water-soluble comonomer is present in the mixture in a concentration of about 50% to about 60% by weight of total monomers.

30. The binder of claim 5 wherein the first water-soluble comonomer is present in the mixture in a concentration of about 60% to about 75% by weight of total monomers and the second water-soluble comonomer is present in the mixture in a concentration of about 25% to about 40% by weight of total monomers.

* * * * *

UNITED STATES PATENT AND TRADEMARK OFFICE
CERTIFICATE OF CORRECTION

PATENT NO. : 5,314,943

DATED : May 24, 1994

INVENTOR(S) : PAUL J. STEINWAND ET AL.

It is certified that error appears in the above-indentified patent and that said Letters Patent is hereby corrected as shown below:

On the title page item [73],

CHANGE THE NAME OF THE ASSIGNEE FROM    "ROHM AND HAAX"

TO READ   --- ROHM AND HAAS COMPANY.

Signed and Sealed this

Eighth Day of August, 1995

Attest:

BRUCE LEHMAN

Attesting Officer

Commissioner of Patents and Trademarks